(12) United States Patent
Amaya et al.

(10) Patent No.: US 9,969,002 B2
(45) Date of Patent: May 15, 2018

(54) THREE-DIMENSIONAL SHAPING DEVICE

(71) Applicant: Matsuura Machinery Corporation, Fukui, Fukui (JP)

(72) Inventors: Kouichi Amaya, Fukui (JP); Toshihiko Kato, Fukui (JP); Tetsushi Midorikawa, Fukui (JP); Hideto Matsubara, Fukui (JP); Mitsuyoshi Yoshida, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days. days.

(21) Appl. No.: 15/387,025

(22) Filed: Dec. 21, 2016

(65) Prior Publication Data
US 2018/0015541 A1   Jan. 18, 2018

(30) Foreign Application Priority Data

Jul. 13, 2016  (JP) ................................. 2016-138082

(51) Int. Cl.
| | | |
|---|---|---|
| *B29C 67/00* | (2017.01) | |
| *B22F 3/105* | (2006.01) | |

(Continued)

(52) U.S. Cl.
CPC .............. *B22F 3/1055* (2013.01); *B22F 3/24* (2013.01); *B33Y 10/00* (2014.12); *B33Y 30/00* (2014.12);

(Continued)

(58) Field of Classification Search
CPC ........ B29C 67/0077; B29C 2034/1683; B29C 64/34; B29C 64/357; B29C 64/364; B33Y 40/00
See application file for complete search history.

(56) References Cited

U.S. PATENT DOCUMENTS 5,676,904 A * 10/1997 Almquist ................ B29C 41/12
425/147
7,700,016 B2 * 4/2010 Wigand .............. B29C 67/0059
264/139

(Continued)

FOREIGN PATENT DOCUMENTS

JP      2010-37599 A     2/2010
JP      2010-132961 A    6/2010

(Continued)

*Primary Examiner* — Joseph S Del Sole
*Assistant Examiner* — Thu Khanh T Nguyen
(74) *Attorney, Agent, or Firm* — Richard M. Goldberg

(57) ABSTRACT

In a three-dimensional shaping device, a region of an elevatable/lowerable table 2 for forming a powder layer and a region of a powder supply device are divided by a shield plate, an inert gas injection port is provided in the former region, the shield plate can be freely opened or closed so that a powder spraying squeegee traveling on the table is passed through, or a pipe which supplies powder from the powder supply device to the powder spraying squeegee which has traveled to the side of the shield plate penetrates through the shield plate, or a part of the shield plate is the powder supply port for the powder spraying squeegee which has traveled to the side of the shield plate and the pipe protrudes at a lower part and a sintering device applies a laser beam via a transparent region in a ceiling of a chamber.

23 Claims, 13 Drawing Sheets

(51) Int. Cl.
*B33Y 10/00* (2015.01)
*B33Y 30/00* (2015.01)
*B33Y 50/02* (2015.01)
*B22F 3/24* (2006.01)

(52) U.S. Cl.
CPC ....... *B33Y 50/02* (2014.12); *B22F 2003/1057* (2013.01); *B22F 2003/247* (2013.01); *B22F 2998/10* (2013.01)

(56) References Cited

U.S. PATENT DOCUMENTS

| | | | | |
|---|---|---|---|---|
| 8,070,474 | B2* | 12/2011 | Abe | B29C 64/153 |
| | | | | 118/256 |
| 8,137,609 | B2* | 3/2012 | McAlea | B29C 35/16 |
| | | | | 264/113 |
| 8,373,092 | B2* | 2/2013 | Dietrich | B29C 67/0085 |
| | | | | 219/121.6 |
| 2004/0004303 | A1* | 1/2004 | Iskra | B22F 3/1055 |
| | | | | 264/109 |

FOREIGN PATENT DOCUMENTS

| | | |
|---|---|---|
| JP | 2011-6719 A | 1/2011 |
| JP | 2014-125643 A | 7/2014 |
| JP | 2015-507092 A | 3/2015 |
| JP | 2016-78375 A | 5/2016 |
| WO | 2009/131103 A1 | 10/2009 |
| WO | 2011/049143 A1 | 4/2011 |

* cited by examiner

[Fig. 1-1]

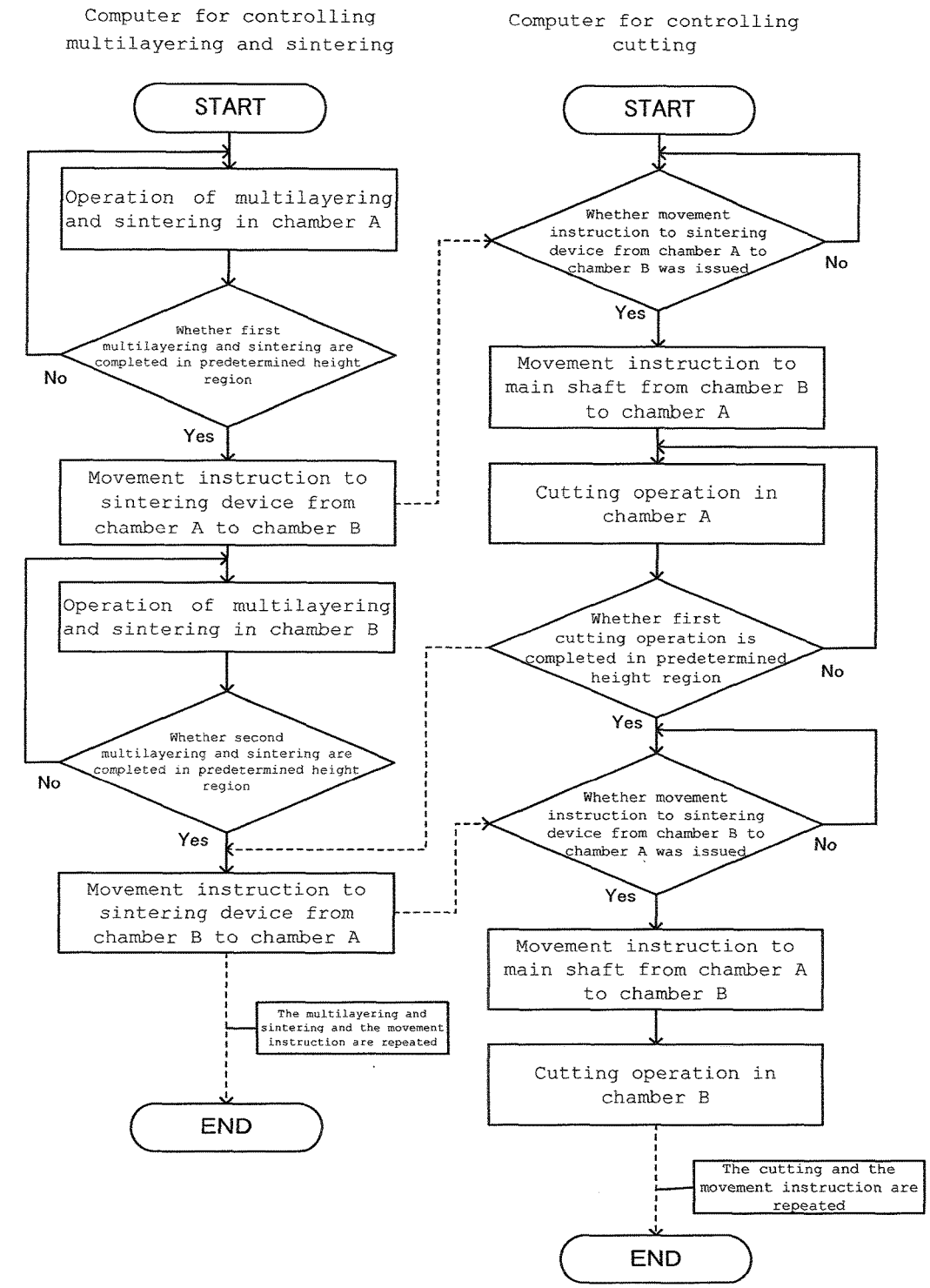
[Fig. 1-2]

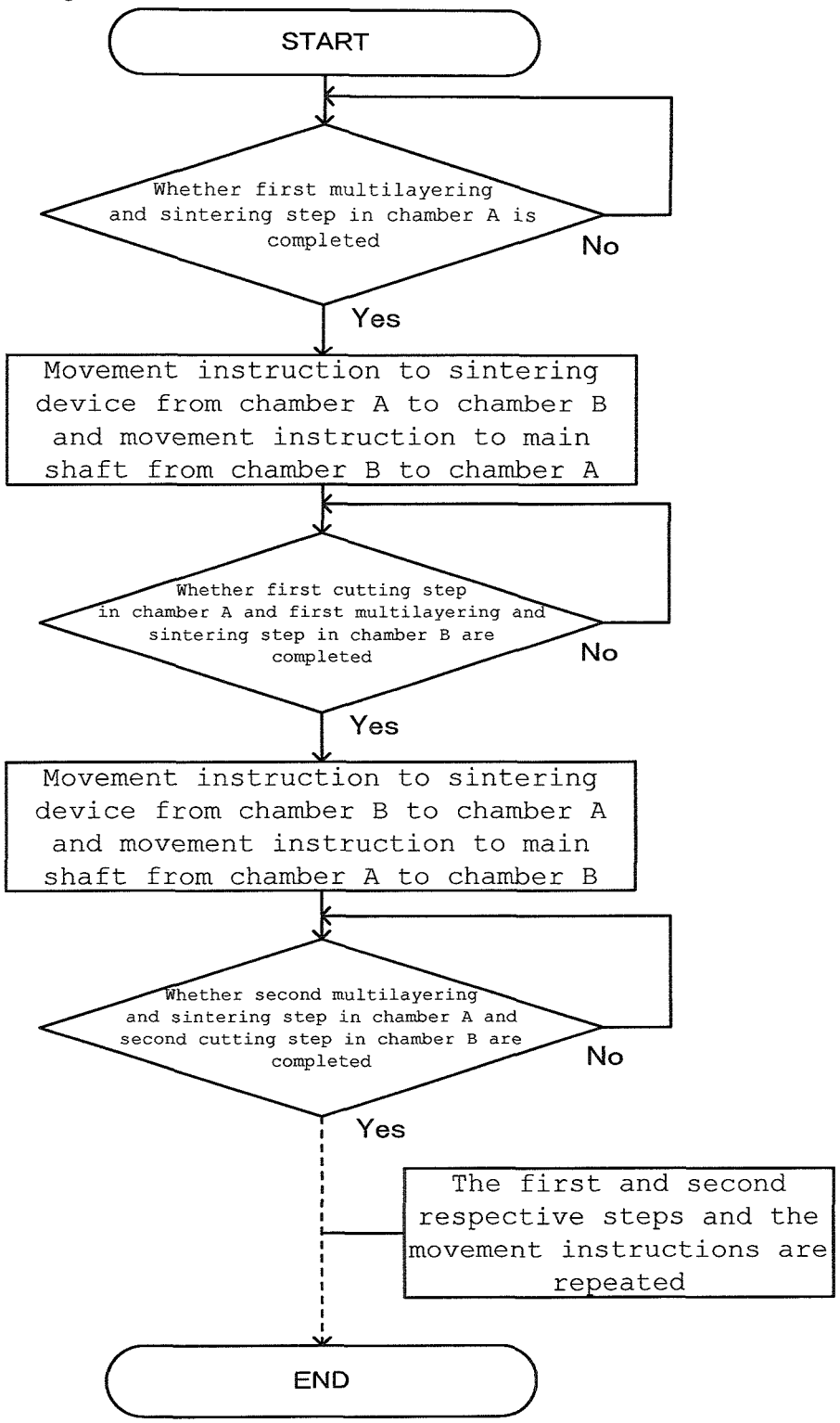

[Fig. 2-1]

[Fig. 2-2]
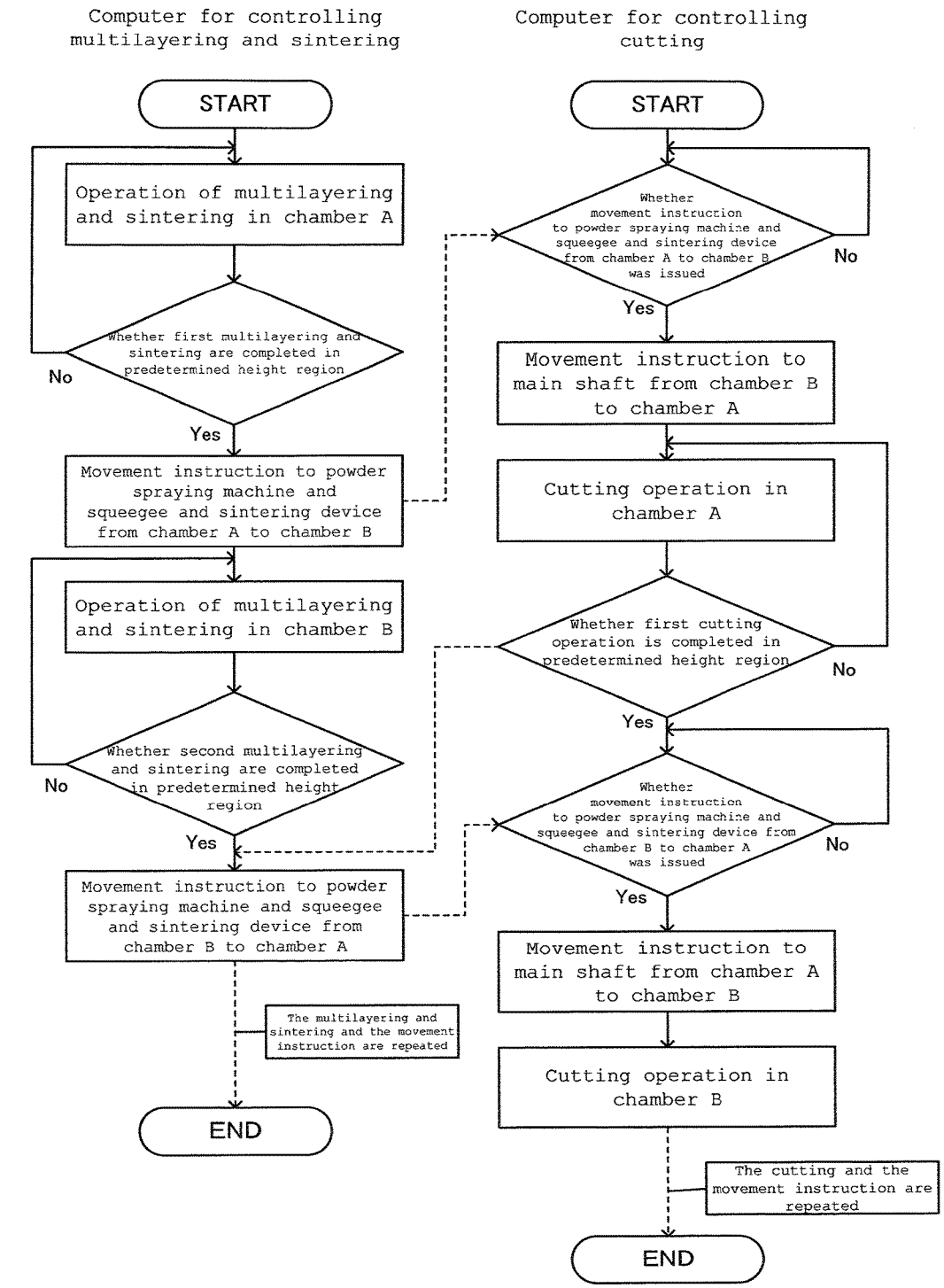

[Fig. 2-3]
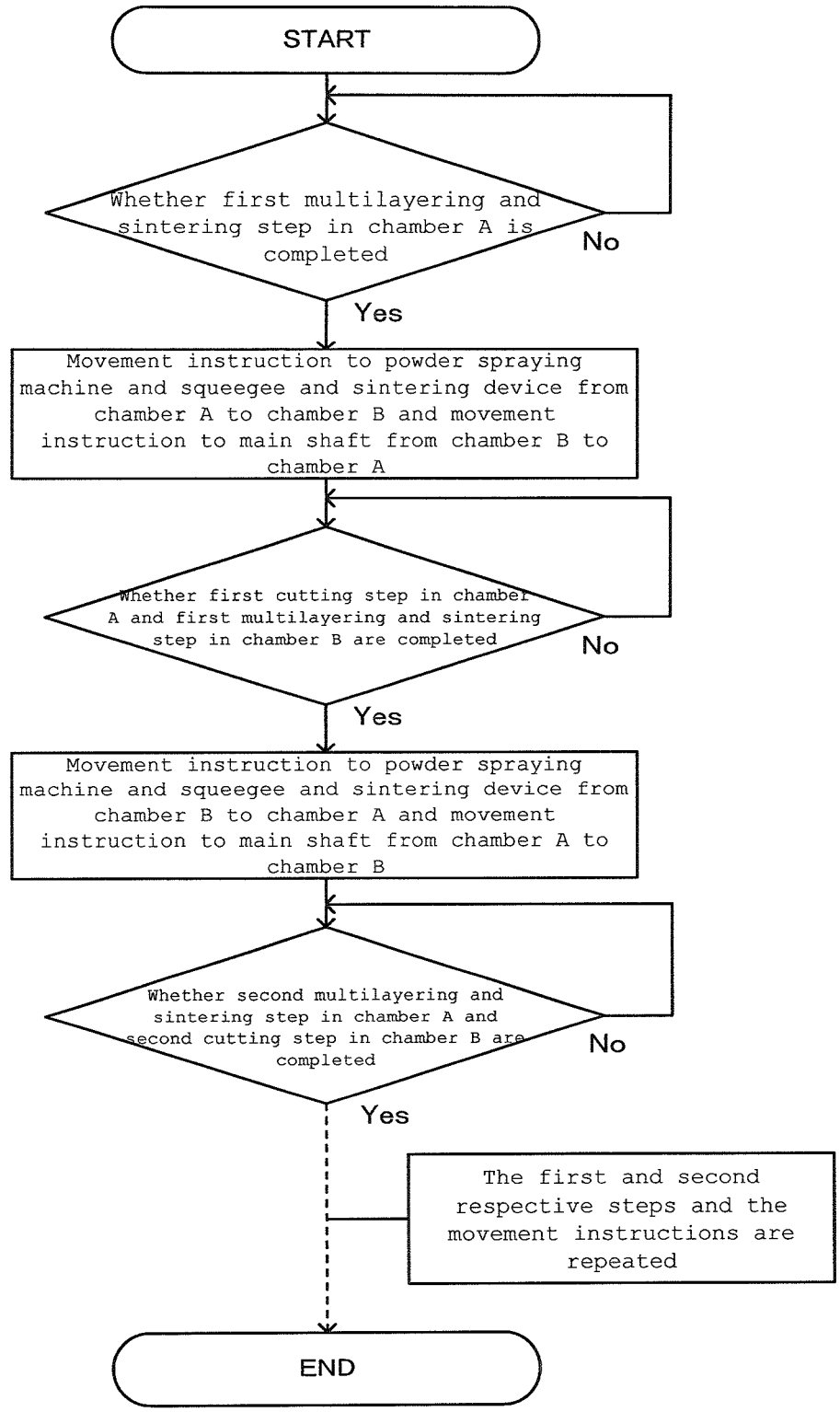

[Fig. 5]
Fig. 5(a)
Fig. 5(b)
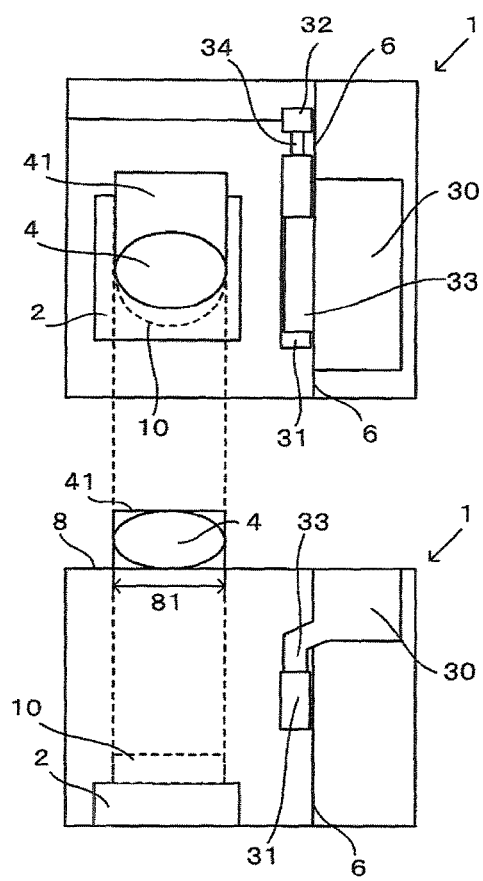
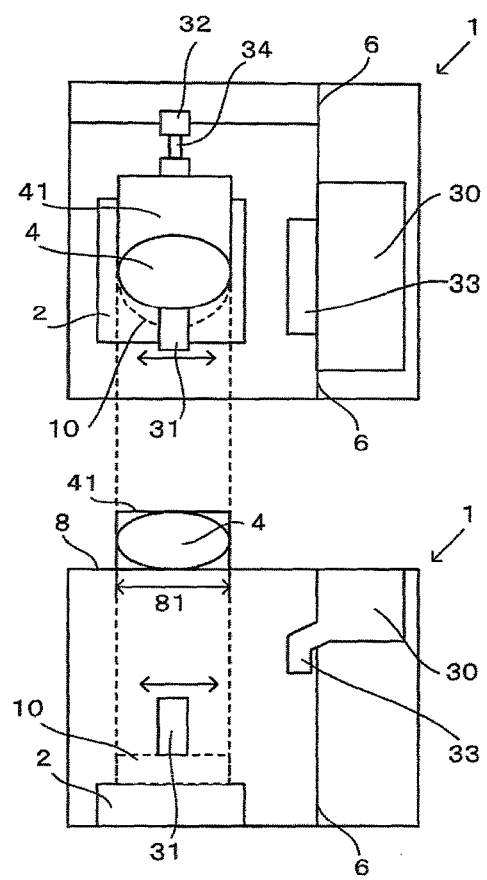

[Fig. 6]

[Fig. 7]
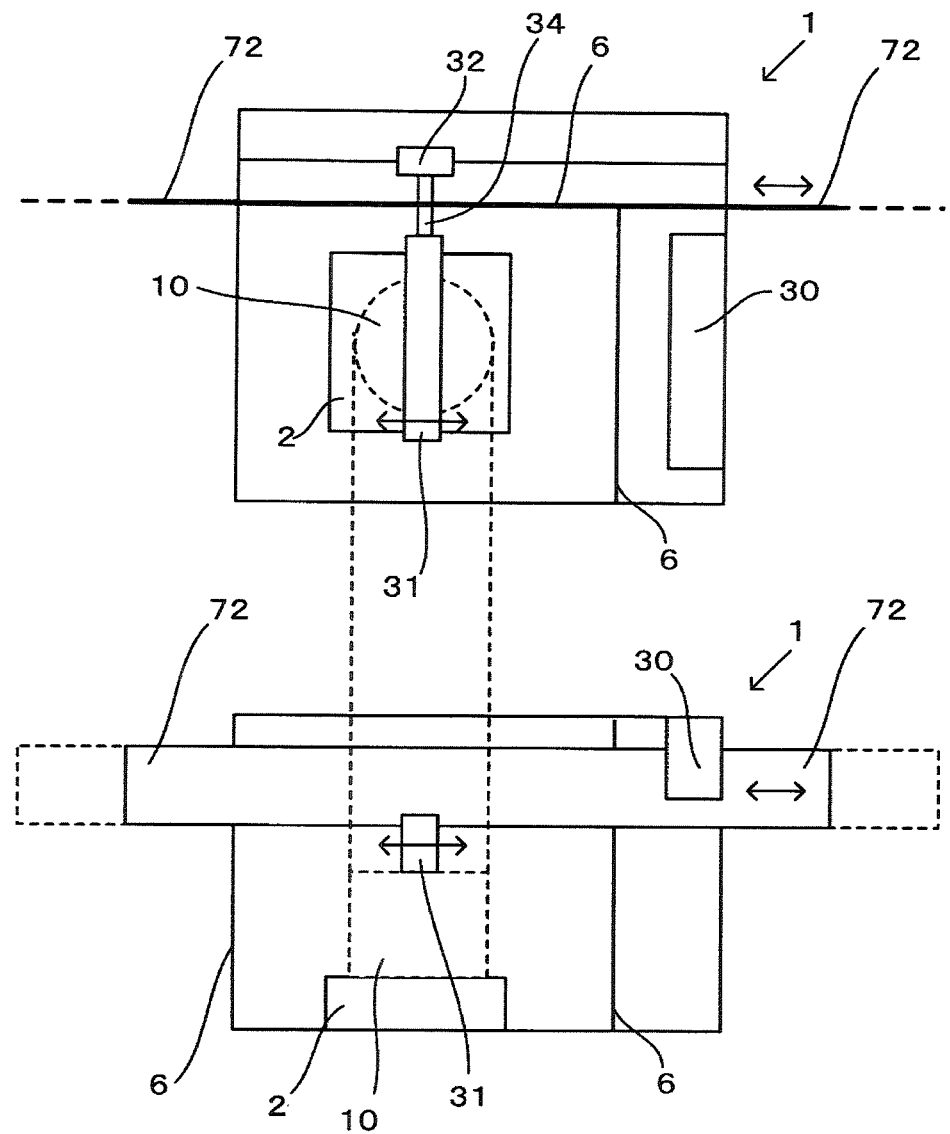

[Fig. 8-1]
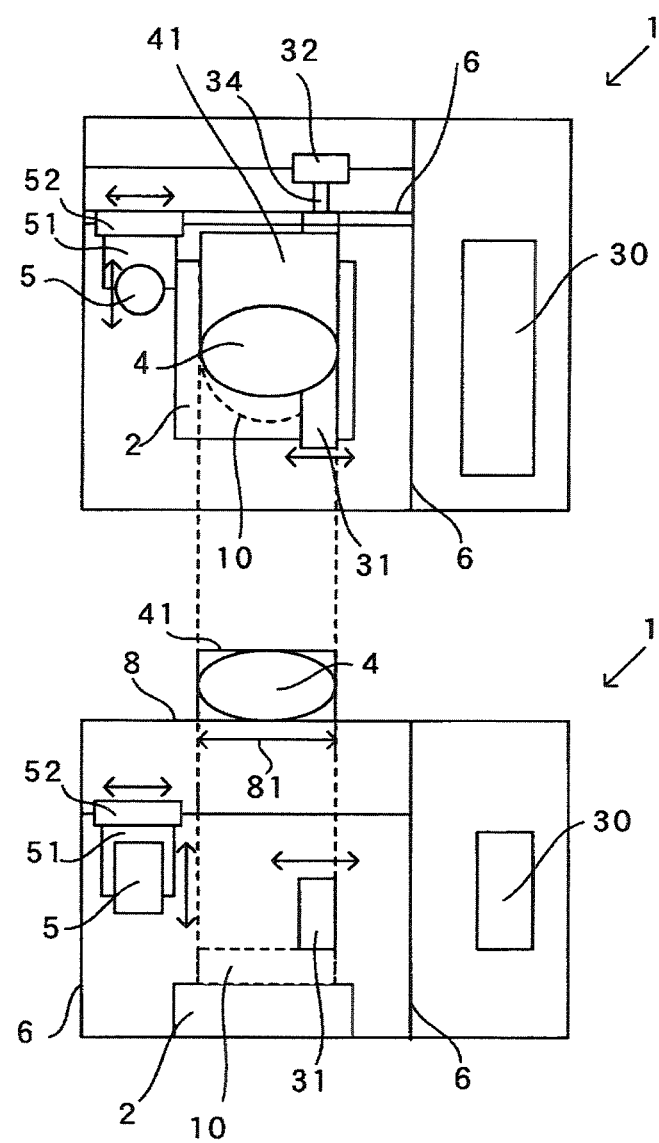

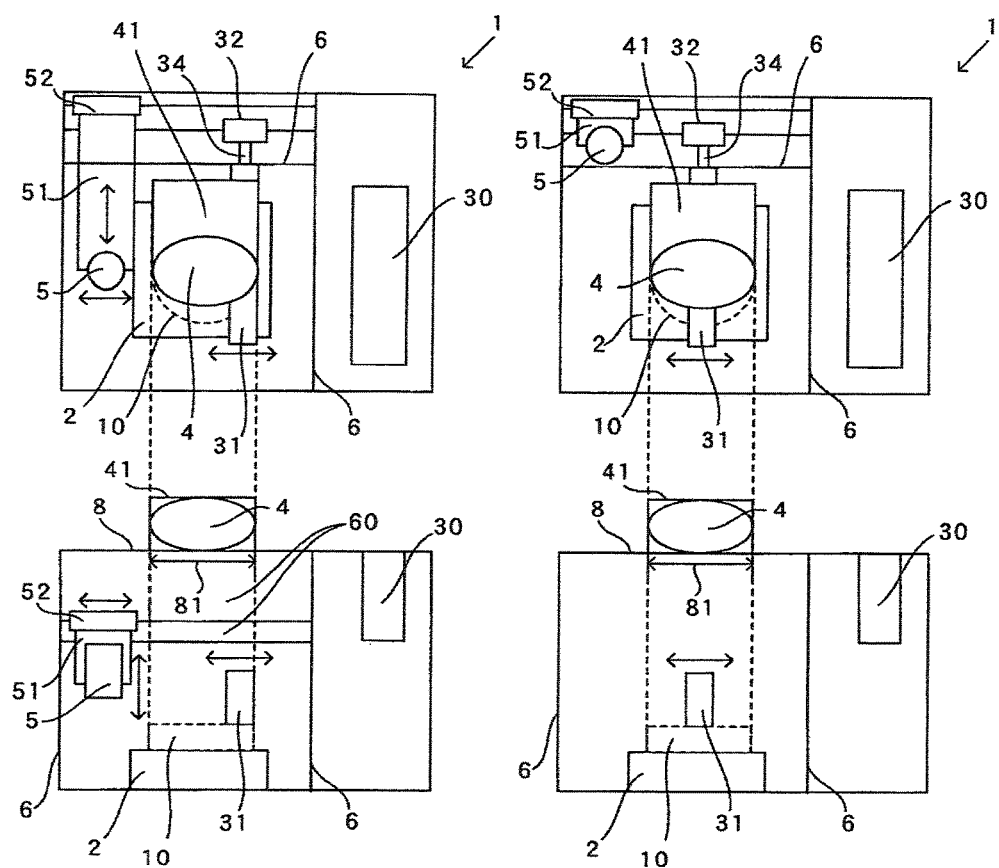
[Fig. 8-2]

THREE-DIMENSIONAL SHAPING DEVICE

BACKGROUND OF THE INVENTION

Technical Field

The present invention relates to a three-dimensional shaping device which realizes the multilayering of powder layers, the sintering of the powder layers with a laser beam and furthermore the cutting of the individual layers after the completion of the sintering.

Background Art

In the case of the three-dimensional shaping device described above, in a region on a table within a chamber, the multilayering and sintering of a plurality of powder layers are performed, thereafter the cutting is performed, and the step of performing the multilayering and sintering of the powder layers and the cutting afterward as described above is repeated.

In the case of three-dimensional shaping, in order to prevent metal powder from being oxidized at the stage of sintering, a chamber is filled with an inert gas such as nitrogen or argon.

However, in a conventional technique, an inert gas is supplied not only to a region of a table and the vicinity thereof where shaping of a three-dimensional article is performed, but also to a region where a powder supply device is present.

For example, in Patent Document 1, a cartridge portion in which an inert gas is stored is installed in the neighborhood of a material storage frame 24 (FIG. 1 and paragraphs [0050] and [0051]), and in the case of such an arrangement, the inert gas supplied from an enclosure 50 is inevitably made to flow also to the side of the powder supply device.

In Patent Document 2, it is proposed that an injection port and a suction port for an inert gas are provided, then the inert gas is made to flow locally to a region to which an optical beam is applied and thus the inert gas is economically utilized.

However, in a case where an inert gas, is made to flow locally, before sintered powder is cooled, the contact of the sintered powder with the inert gas is completed, and the sintered powder is brought into contact with air, with the result that it is impossible to realize sufficient prevention of oxidization.

In Patent Document 3, a shroud 7 in a state where the shroud 7 covers a powder layer 13, a sintering device, that is, an optical beam application means 5, a powder supply device, that is, a powder supply means 3, and a powder spraying machine, that is, a powder smoothing means 4 are integrally provided in three-dimensional directions, and thus moved on a shaping bed 2, with the result that the amount of inert gas used is reduced (abstract, selected diagram in FIG. 1 and paragraph [0024]).

However, the integral configuration of the movement in the three-dimensional directions described above is inconvenient to operate as a device, and the control thereof is extremely complicated in that it is impossible to perform a simple operation in which a table is made elevatable/lowerable and in which then a powder spraying squeegee is independently moved.

As described above, in the conventional technique, with the relatively simple configuration, the efficient use of the inert gas is proposed.

PRIOR ART DOCUMENTS

Patent Documents

Patent Document 1: Japanese Published Unexamined Patent Application No. 2010-037599

Patent Document 2: Re-publication of PCT International Publication No. 2011-049143

Patent Document 3: Japanese Published Unexamined Patent Application No. 2014-125643

SUMMARY OF INVENTION

Technical Problem

An object of the present invention is to provide a configuration of a three-dimensional shaping device in which, in the processing of a three-dimensional shaped article, an elevatable/lowerable table and a powder spraying squeegee traveling on the table are adopted and in which thus it is made possible to efficiently use an inert gas.

Solution to Problem

In order to achieve the above object, the basic configurations of the present invention are as follows:
(1) A three-dimensional shaping device, comprising:
  at least one chamber,
  a region of an elevatable/lowerable table for forming a powder layer within the at least one chamber and a vicinity thereof,
  a region of a powder supply device within the at least one chamber and a vicinity thereof
  an inert gas injection port provided in the region of the elevatable/lowerable table,
  a shield plate to prevent leakage of the inert gas from the region of the elevatable/lowerable table, the shield plate dividing the region of the elevatable/lowerable table from the region of the powder supply device,
  a powder spraying squeegee moving on the powder layer,
  the shield plate is constructed to be freely opened or closed so that the powder spraying squeegee traveling across the table is adapted to pass through the shield plate,
  a sintering device which applies a laser beam to a shaping region of a three-dimensional shaped article on the table via a transparent region in a ceiling of the at least one chamber,
  a horizontal-direction drive mechanism for the powder spraying squeegee, and
  another shield plate divides:
    a) a region of the horizontal-direction drive mechanism for the powder spraying squeegee and a vicinity thereof and
    b) the region of the table and the vicinity thereof.
(2) A three-dimensional shaping device, comprising:
  at least one chamber,
  a region of an elevatable/lowerable table for forming a powder layer within the at least one chamber and a vicinity thereof,
  a region of a powder supply device within the at least one chamber and a vicinity thereof,
  an inert gas injection port provided in the region of the elevatable/lowerable table,
  a shield plate to prevent leakage of the inert gas from the region of the elevatable/lowerable table, the shield plate dividing the region of the elevatable/lowerable table from the region of the powder supply device,
  a powder spraying squeegee moving on the powder layer,
  a pipe which supplies powder dropped from the powder supply device to the powder spraying squeegee which has traveled to a side of the shield plate penetrates through the shield plate, a sintering device which applies a laser beam to a shaping region of a three-dimensional shaped article on the table via a transparent region in a ceiling of the at least one chamber, a horizontal-direction drive mechanism for the powder spraying squeegee, and another shield plate divides:
  a) a region of the horizontal-direction drive mechanism for the powder spraying squeegee and a vicinity thereof and
  b) the region of the table and the vicinity thereof.

(3) A three-dimensional shaping device, comprising:
  at least one chamber,
  a region of an elevatable/lowerable table for forming a powder layer within the at least one chamber and a vicinity thereof,
  a region of a powder supply device within the at least one chamber and a vicinity thereof,
  an inert gas injection port provided in the region of the elevatable/lowerable table,
  a shield plate to prevent leakage of the inert gas from the region of the elevatable/lowerable table, the shield plate dividing the region of the elevatable/lowerable table from the region of the powder supply device,
  a powder spraying squeegee moving on the powder layer,
  a part of a region of the shield plate forms a powder supply port for the powder spraying squeegee which has traveled to a side of the shield plate,
  a pipe through which powder passes through when dropping from the supply port is provided to protrude at a lower part of the shield plate,
  a sintering device which applies a laser beam to a shaping region of a three-dimensional shaped article on the table via a transparent region in a ceiling of the at least one chamber,
  a horizontal-direction drive mechanism for the powder spraying squeegee, and
  another shield plate divides:
    a) a region of the horizontal-direction drive mechanism for the powder spraying squeegee and a vicinity thereof and
    b) the region of the table and the vicinity thereof.

(4) The three-dimensional shaping device of any one of the above (1) to (3), which is characterized in that a region of a horizontal-direction drive mechanism for the powder spraying squeegee and a vicinity thereof and the region of the table and the vicinity thereof are divided by the shield plate.

Advantageous Effects of Invention

In the three-dimensional shaping devices of the basic configurations (1), (2) and (3), the region of the powder supply device and the vicinity thereof are basically not filled with the inert gas, and it is made possible to prevent the three-dimensional shaped article from being oxidized at the stage of sintering and the subsequent stages.

Moreover, in the case of the basic configuration (4) described above, the region of the horizontal-direction drive mechanism for the powder spraying squeegee and the vicinity thereof are not filled with the inert gas, and it is possible to prevent the oxidization described above.

Figures 1, 1A:
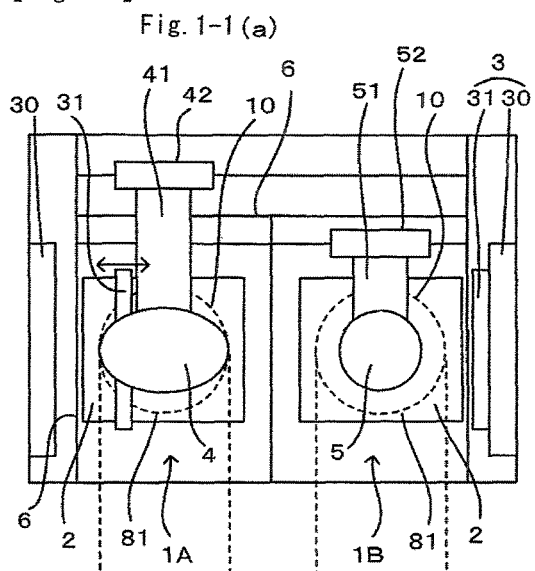
FIG. 1-1 shows the configuration of Example 1, FIG. 1-1(*a*) shows a state where multilayering and sintering are performed in a chamber A and where cutting is performed in a chamber B, FIG. 1-1(*b*) shows a state where the cutting is performed in the chamber A and where the multilayering and the sintering are performed in the chamber B.
Figures 1A, 2:
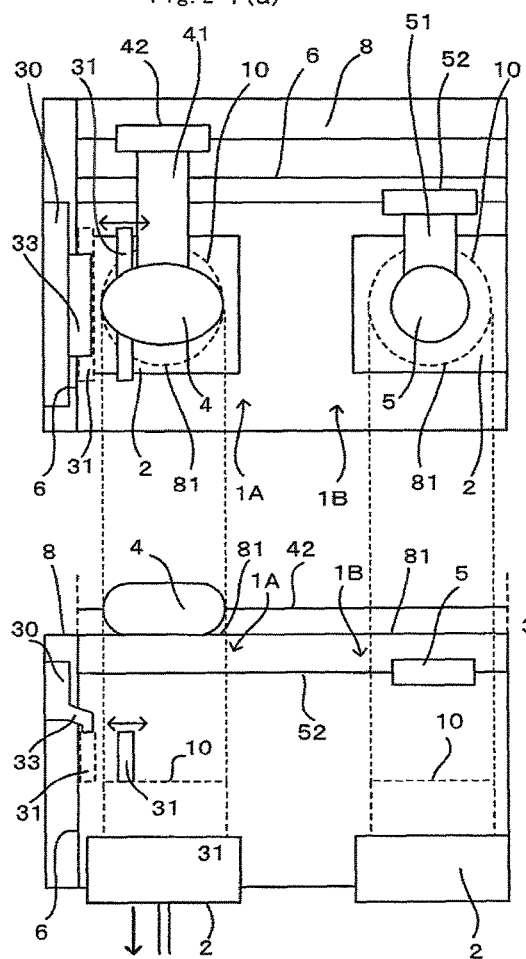
Figures 1B, 2:
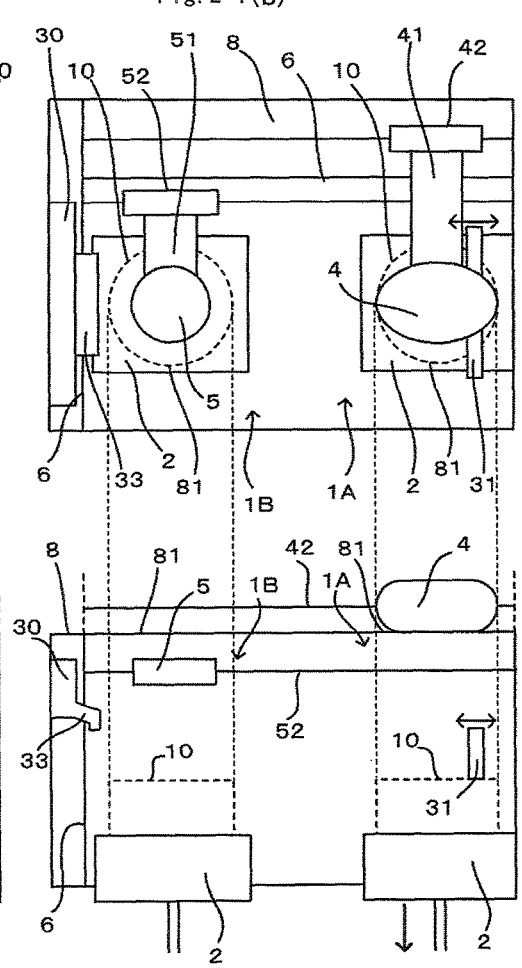

And downward arrows show a state where a table is sequentially lowered as the multilayering proceeds;

FIG. 1-2 shows a flow chart showing that in Example 1, a computer for controlling the multilayering and the sintering controls the movement of a sintering device and that a computer for controlling the cutting controls the movement of a main shaft;

FIG. 1-3 is a flow chart showing the conditions in Example 1, a computer for controlling the alternate movement of the sintering device and the main shaft is provided, and is operated with the computer for controlling the multilayering and the sintering and with the computer for controlling the cutting with the main shaft in a coordinated manner;

FIG. 2-1 shows the configuration of Example 2, FIG. 2-1(*a*) shows a state where the multilayering and the sintering are performed in the chamber A and where the cutting is performed in the chamber B, FIG. 2-1(*b*) shows a state where the cutting is performed in the chamber A and where the multilayering and the sintering are performed in the chamber B.

And downward arrows show a state where the table is sequentially lowered as the multilayering proceeds;

FIG. 2-2 shows a flow chart showing that in Example 2, the computer for controlling the multilayering and the sintering controls the movement of a powder spraying squeegee and the sintering device, and that the computer for controlling the cutting with the main shaft controls the movement of the main shaft;

FIG. 2-3 is a flowchart showing the conditions in Example 2, a computer for controlling the alternate movement of the powder spraying squeegee and the sintering device, and the main shaft is provided, and is operated with the computer for controlling the multilayering and the sintering and with the computer for controlling the cutting in a coordinated manner;

FIG. 3 is a top view and a side cross-sectional view showing the basic configuration (1), FIG. 3(*a*) shows a state where powder is supplied to the powder spraying squeegee and FIG. 3(*b*) shows a state where the powder spraying squeegee is moved on the multilayer powder;

FIG. 4 is a top view and a side cross-sectional view showing the basic configuration (2), FIG. 4(*a*) shows a state where the powder is supplied to the powder spraying squeegee and FIG. 4 (*b*) shows a state where the powder spraying squeegee is moved on the multilayer powder;

FIG. 5 is a top view and a side cross-sectional view showing the basic configuration (3), FIG. 5(*a*) shows a state where powder is supplied to the powder spraying squeegee and FIG. 5(*b*) shows a state where the powder spraying squeegee is moved on the multilayer powder;

FIG. 6 is a top view and a side cross-sectional view showing, in the basic configuration (4), embodiments in which a rotation shaft penetrates through a shield plate, FIG. 6(*a*) shows the embodiment in which the rotation shaft is engaged with a ball screw for moving the powder spraying squeegee and FIG. 6(*b*) shows the embodiment in which the rotation shaft is engaged with a chain for moving the powder spraying squeegee;

FIG. 7 shows, in the basic configuration (4), an embodiment in which a member that supports the powder spraying squeegee and that is integrally moved in a horizontal direction is fixed to a door that slides along the shield plate without forming an opening state and in which the door is coupled to a horizontal-direction drive mechanism for the powder spraying squeegee;

FIG. 8-1 shows, in the basic configuration (4) and in an embodiment in which the main shaft for cutting a three-dimensional shaped article is moved within the region of a table 2 and the vicinity thereof, an embodiment in which a three-dimensional-direction drive mechanism for the main shaft is provided within the region of the table 2 and the vicinity thereof; and FIG. 8-2 shows, in the basic configuration (4) and in the embodiment in which the main shaft for cutting the three-dimensional shaped article is moved within the region of the table 2 and the vicinity thereof, an embodiment in which the shield plate is made so as to be freely opened or closed and in which the three-dimensional-direction drive mechanism for the main shaft is provided on the side of the region of the horizontal-direction drive mechanism for the powder spraying squeegee and the vicinity thereof.

DESCRIPTION OF EMBODIMENTS

In any of the basic configurations (1), (2) and (3), the region of the table 2 and the vicinity thereof and the region of the powder supply device 30 and the vicinity thereof are divided by the shield plate 6, the inert gas injection port is provided in the former region and the sintering device 4 is provided which applies a laser beam to the shaping region of the three-dimensional shaped article 10 via the transparent region 81 in the ceiling 8 of the chamber 1.

The ceiling 8 is preferably in a hermetically sealed state between a wall surrounding the region of the table 2 and the vicinity thereof and the shield plate 6 dividing both regions.

Figure 3A:
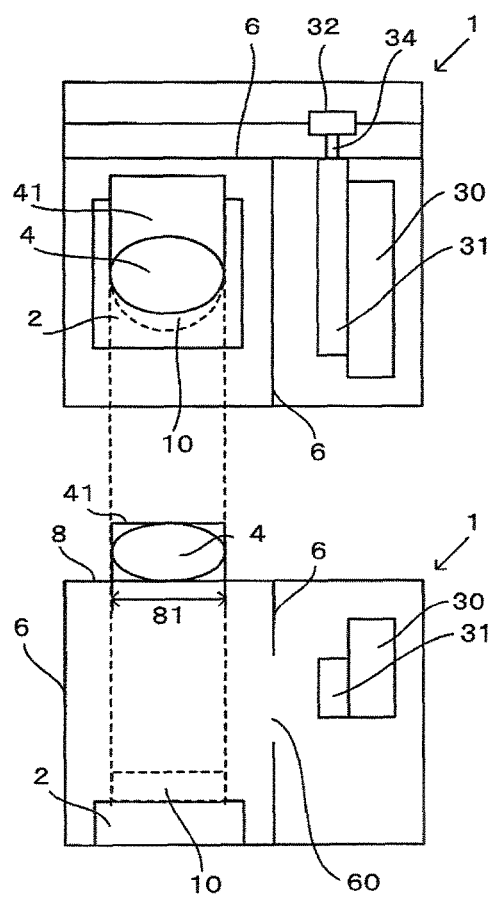

In the case of the basic configuration (1), as shown in FIG. 3(a), in order for the powder spraying squeegee 31 to receive the supply of the powder from the powder supply device 30, it is essential to bring the shield plate 6 into an open state, and thus a small amount of inert gas cannot be prevented from leaking, via the opening portion 60 of the shield plate 6, to the side of the region of the powder supply device 30 and the vicinity thereof.

Figure 3B:
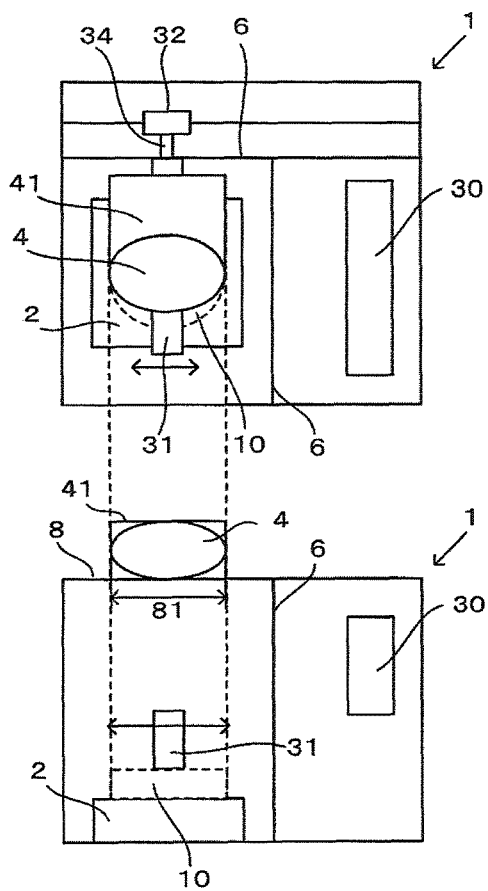

However, as shown in FIG. 3(b), at the stages of the forming and the sintering of the powder layer, the shield plate 6 is brought into a closed state and the amount of inert gas jetted to the region of the table 2 and the vicinity thereof is adjusted, thus it is sufficiently possible to make up for the leaked inert gas described above and to fill the regions.

Moreover, in the powder spraying squeegee 31, the supply of the powder to the powder spraying squeegee 31 is not performed for every layer in the multilayers, but the storage volume for the powder which makes it possible to perform the supply for every multilayer, specifically, every four or more layers is set, and thus it is possible to lower the degree of the leakage described above.

Figure 4A:
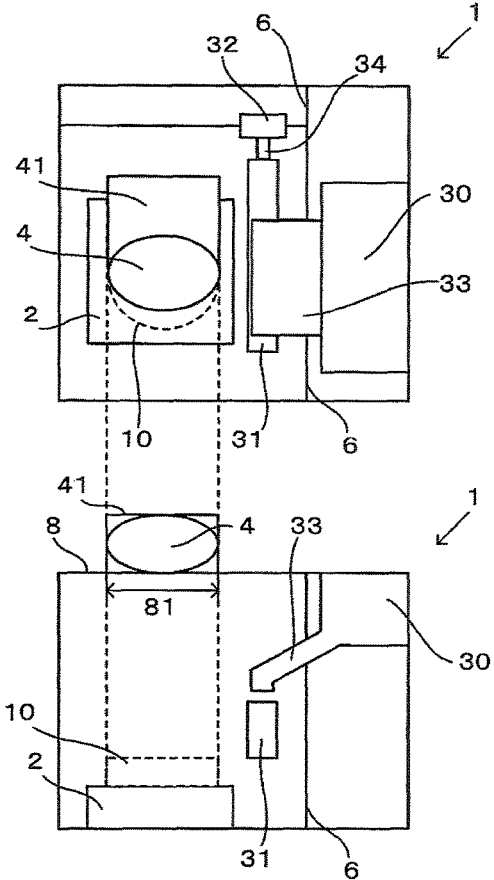
Figure 4B:
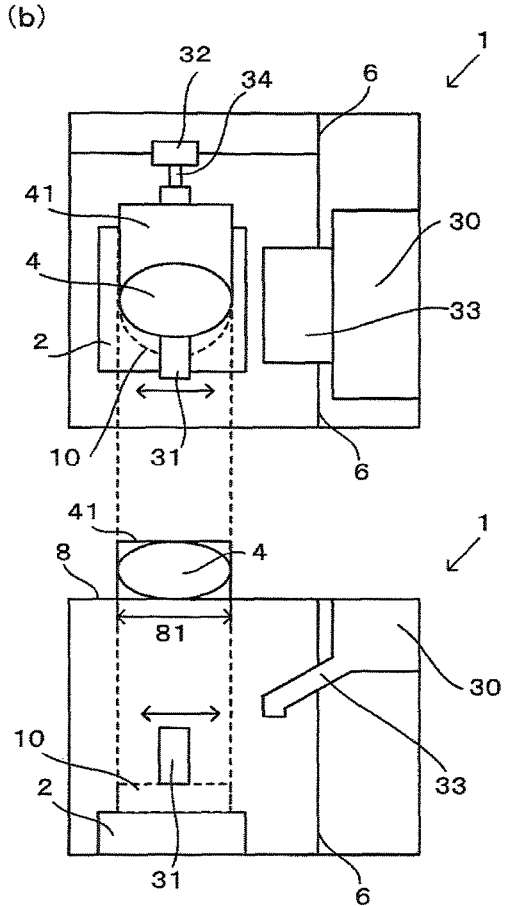

In the case of the basic configuration (2), as shown in FIGS. 4(a) and 4(b), the pipe 33 which supplies the powder dropped from the powder supply device 30 to the powder spraying squeegee 31 which has reached to the side of the shield plate 6 penetrates through the shield plate 6.

In the case of the basic configuration (3), as shown in FIGS. 5(a) and 5(b), a part of the region of the shield plate 6 is used as the powder supply port for the powder spraying squeegee 31 which has reached to the side of the shield plate 6, and the pipe 33 through which the powder passes when dropping downward from the supply port is provided to protrude at a lower part.

In the case of the basic configurations (2) and (3), it is possible to prevent the inert gas from reaching to the region of the powder supply device 30 and the vicinity thereof and the basic configurations (2) and (3) are superior to the basic configuration (1) in that the inert gas is efficiently utilized.

In the case of the basic configuration (2), it is also possible to obtain an effect of lowering the degree of the oxidization of the powder in storage by the inert gas entering into the side of the powder supply device 30 through opening outlet of the powder.

However, even in the basic configurations (1) and (3), in particular, by filling the powder supply device 30 with the inert gas, it is naturally possible to obtain the same effect.

It is to be noted that, in the case of the sintering device 4 using a laser beam, it is possible to realize the sintering via the transparent region 81 of the ceiling 8, whereas in the case of an electron beam, since it is impossible to transmit the transparent region 81, thus an electron beam is not adopted in the basic configurations (1), (2) and (3).

Although in the three-dimensional shaping device, the horizontal-direction drive mechanism 32 for alternately moving the powder spraying squeegee 31 to the side of the powder supply device 30 and to the side opposite thereto is provided, in the basic configurations (1), (2) and (3), it is not essential to divide, with the shield plate 6, the region of the horizontal-direction drive mechanism 32 and the vicinity thereof and the region of the table 2 and the vicinity thereof, and FIGS. 4 and 5 show such a case.

By contrast, based on the configurations of the basic configurations (1), (2) and (3), the basic configuration (4) is characterized in that the region of the horizontal-direction drive mechanism 32 for the powder spraying squeegee 31 and the vicinity thereof and the region of the table 2 and the vicinity thereof are divided by the shield plate 6, and FIGS. 3(a) and 3(b) show the basic configuration (4) in a case based on the basic configuration (1) (illustration of the basic configuration (4) based on the basic configurations (2) and (3) is omitted).

With the characteristics described above, it is possible to prevent the former region from being filled with the inert gas.

It is to be noted that the horizontal-direction drive mechanism 32 for the powder spraying squeegee 31 naturally has a drive source, and the same is true for the horizontal-direction drive mechanism 42 for the sintering device 4 and the three-dimensional-direction drive mechanism 52 for the main shaft 5 which will be described later.

Figure 6A:
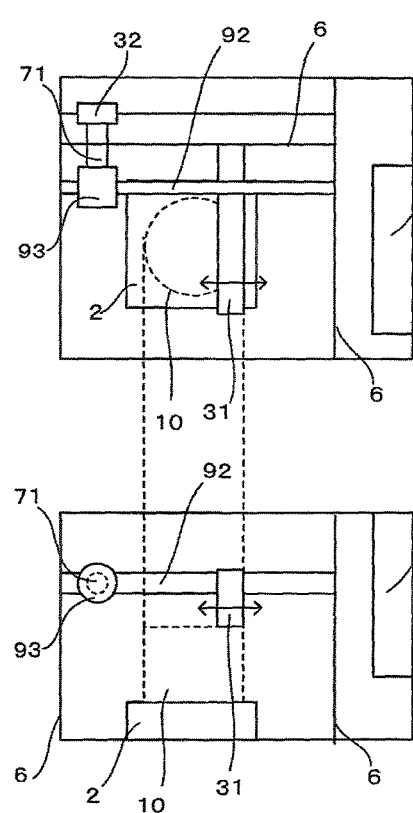
Figure 6B:
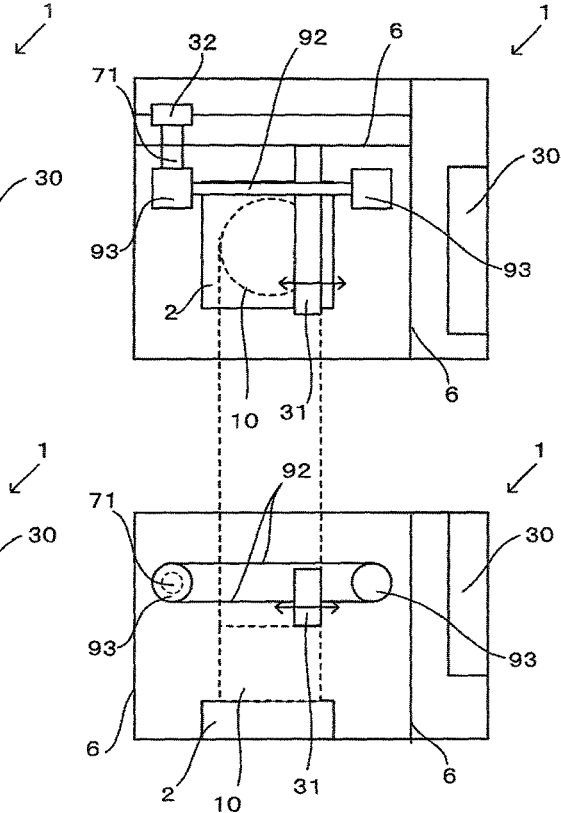

FIGS. 6(a) and 6(b) show embodiments which are characterized in that, a ball screw or a chain for movement 92 which moves the powder spraying squeegee 31 in the horizontal direction is provided in the region of the table 2 and the vicinity thereof, and in which a rotation shaft 71 that transmits rotation drive to the ball screw or the chain for movement 92 penetrates through the shield plate 6 and is coupled to the horizontal-direction drive mechanism 32, and FIG. 6(a) shows the embodiment in which the rotation shaft 71 is engaged with the ball screw 92 and FIG. 6(b) shows the embodiment in which the rotation shaft 71 is engaged with the chain for movement 92 (in FIGS. 6(a) and 6(b), the illustration of a specific configuration in which the powder is supplied from the powder supply device 30 to the powder spraying squeegee 31 is omitted).

In the case of the embodiment described above, since almost no gap is formed between the rotation shaft 71 and the shield plate 6, it is unlikely that the inert gas leaks from the region of the table 2 and the vicinity thereof to the region of the horizontal-direction drive mechanism 32 for the powder spraying squeegee 31 and the vicinity thereof.

FIG. 7 shows an embodiment which is characterized in that, a support member 34 that supports the powder spraying squeegee 31 and that is moved in the horizontal direction together with the powder spraying squeegee 31 is fixed to a door 72 that slides within the shield plate 6, and in which the door 72 has a horizontal width larger than that of the shield plate 6 such that a state where an opening portion is not formed in the sliding is made possible to be realized and then the door 72 is coupled to the horizontal-direction drive mechanism 32 (it is to be noted that, also in FIG. 7, the illustration of a specific configuration in which the powder is supplied from the powder supply device 30 to the powder spraying squeegee 31 is omitted).

In the embodiment described above, since the length of the door 72 is designed such that even when the door 72 slides on the shield plate 6, the opening portion is prevented from being formed between the door 72 and the shield plate 6, the inert gas which fills the region of the table 2 and the vicinity thereof is prevented from leaking via the opening portion to the region of the horizontal-direction drive mechanism 32 for the powder spraying squeegee 31 and the vicinity thereof.

Both the state where the rotation shaft 71 penetrates through the shield plate 6 in the embodiment of FIG. 6 and the state where the door 72 slides on the shield plate 6 in FIG. 7 are preferably in a hermetically sealed state.

For that, it is possible to realize the purpose by setting the shape of a gap formed between the rotation shaft 71 or the door 72 and the shield plate 6 and the distance necessary for passing through the gap such that, in the case where the inert gas and air flow through the gap, the flow resistance is extremely large to the extent that the passing-through amount can be disregarded.

In the basic configuration (4), it is possible to adopt any one of the embodiments which is characterized in that, as shown in FIG. 8-1, the main shaft 5 for cutting the sintered three-dimensional shaped article 10 and the three-dimensional-direction drive mechanism 52 for the main shaft 5 are provided within the region of the table 2 and the vicinity thereof, and the embodiment which is characterized in that, as shown in FIG. 8-2, the shield plate 6 for dividing the region of the table 2 and the vicinity thereof and the region of the horizontal-direction drive mechanism 32 for the powder spraying squeegee 31 and the vicinity thereof is made so as to be freely opened or closed and in which the three-dimensional-direction drive mechanism 52 for the main shaft 5 for cutting the sintered three-dimensional shaped article 10 is provided on the side of the region of the horizontal-direction drive mechanism 32 for the powder spraying squeegee 31 and the vicinity thereof (it is to be noted that, also in FIGS. 8-1 and 8-2, the illustration of a specific configuration in which the powder is supplied from the powder supply device 30 to the powder spraying squeegee 31 is omitted).

In each of the embodiments described above as well, basically, it is possible to reduce the filling of the region of the horizontal-direction drive mechanism 32 for the powder spraying squeegee 31 and the vicinity thereof with the inert gas.

However, it is impossible to deny the fact that the embodiment in which, as in the embodiment of FIG. 8-2, the shield plate 6 of the basic configuration (4) is made so as to be freely opened or closed and then in which the shield plate 6 is opened at each time the main shaft 5 is moved, is inferior to the embodiment in which, as in FIG. 8-1, the three-dimensional-direction drive mechanism 52 for the main shaft 5 is provided within the region of the table 2 and the vicinity thereof in the point that a small amount of inert gas leaks from the region of the table 2 and the vicinity thereof via the opening portion 60 at the stage of opening.

However, at the stage of the forming and the sintering of the powder layer, the amount of inert gas jetted to the region of the table 2 and the vicinity thereof is adjusted, and thus it is sufficiently possible to make up for and load the leaked inert gas as described above.

Moreover, in the case where, in the embodiment of FIG. 8-2, a method is adopted where, one table 2, one powder supply device 30 and one powder spraying squeegee 31, and one sintering device 4 are adopted for one chamber 1, and then the cutting with the main shaft 5 is performed after the completion of all steps of the multilayering of the powder with the powder spraying squeegee 31 and the sintering of the powder with the sintering device 4, since, at the stage of the cutting, there is already a very low possibility that metal powder involving sintering is oxidized, hence it is possible to sufficiently avoid the damage of the leakage.

A description will be given below according to Examples.

EXAMPLE 1

Figures 1, 1B:
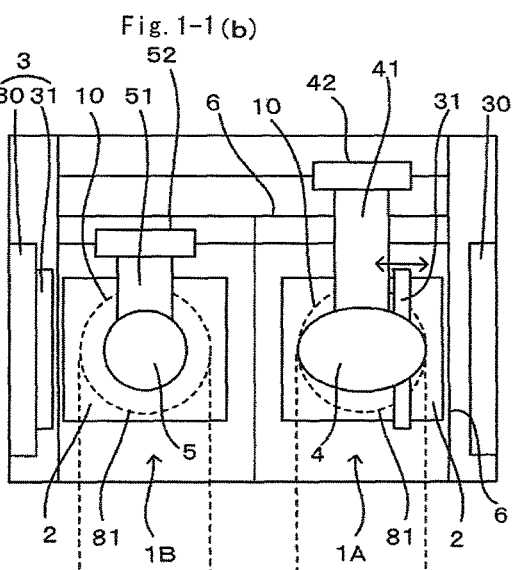

Example 1 is characterized in that, as shown in FIGS. 1-1(a) and 1-1(b), the table 2 is provided in each of the regions on the side where two chambers 1 are adjacent to each other, the powder supply device 30 is provided in each of the regions where the two chambers 1 are not adjacent to each other, one main shaft 5 is provided which is moved by the three-dimensional-direction drive mechanism 52 provided within the regions where the two chambers 1 are adjacent to each other, one sintering device 4 is provided which is moved by the horizontal-direction drive mechanism 42 provided on the upper side of the ceiling 8 of the regions where the two chambers are adjacent to each other and a control device is provided which alternately moves the one main shaft 5 and the one sintering device 4 between the two chambers 1 (FIGS. 1-1(a) and 1-1(b) showcases which are based on the basic configuration (1)).

Due to the characteristics described above, Example 1 is significant as compared with the case of the conventional technique, in terms of economical cost, in the point that it suffices to provide one powder multilayer device and one main shaft 5 for two chambers 1.

Moreover, by making it possible to simultaneously perform the multilayering step and the sintering step of the powder layer and the cutting step in the two chambers 1, it becomes possible to avoid the occurrence of a waiting time of the main shaft 5 for all the time of the multilayering step and the sintering step and the occurrence of a waiting time of the sintering device 4 for all the time of the cutting step.

It is to be noted that, in Example 1, since the sintering device 4 and the main shaft 5 need the control device capable of alternately moving the sintering device 4 and the main shaft 5 between the two chambers 1, it is essential that the three-dimensional-direction drive mechanism 52 for the main shaft 5 is inevitably provided within the region of the table 2 and the vicinity thereof, that is, the three-dimensional-direction drive mechanism 52 for the main shaft 5 is based on the embodiment of FIG. 8-1.

In Example 1, in order to realize the multilayering, the sintering, the cutting and the alternate movement, as shown in the flow chart of FIG. 1-3, the control method can be adopted in which the computer for controlling the multilayering and the sintering controls the movement of the sintering device 4 and in which the computer for controlling the cutting controls the movement of the main shaft 5.

Furthermore, as shown in FIG. 1-3, the control method can also be adopted in which, in addition to the computer for controlling the multilayering and the sintering and the computer for controlling the cutting, the computer for controlling the movement of the sintering device 4 and the main shaft 5 is provided and is operated with the computer for controlling the multilayering and the sintering and the computer for controlling the cutting in a coordinated manner.

EXAMPLE 2

Example 2 is characterized in that as shown in FIGS. 2-1(a) and 2-1(b), the table 2 is provided in each of the regions on the side where two chambers 1 are adjacent to each other, one powder supply device 30 is provided on one side of the regions where the two chambers 1 are not adjacent to each other, one main shaft 5 is provided which is moved by the three-dimensional-direction drive mechanism 52 provided within the regions where the two chambers 1 are adjacent to each other, one sintering device 4 is provided which is moved by the horizontal-direction drive mechanism 42 provided on the upper side of the ceiling 8 of the regions where the two chambers 1 are adjacent to each other and a control device is provided which alternately moves the one main shaft 5, and the one sintering device 4 and one powder spraying squeegee 31 corresponding to the one powder supply device 30 between the two chambers 1 (it is to be noted that FIGS. 2-1(a) and 2-1(b) show cases which are based on the basic configuration (2), and FIG. 2-1(a) shows a state where the powder spraying squeegee 31 indicated by dotted lines receives the supply of the powder via the pipe 33 from the powder supply device 30).

In Example 2 as well, the same actions and effects as in Example 1 can be achieved, and it is essential that the main shaft 5 for performing the cutting is provided in the region of the table 2 and the vicinity thereof.

In Example 2 as well, in order to realize the alternate movement, as shown in the flow chart of FIG. 2-2, the control method can be adopted in which the computer for controlling the multilayering and the sintering controls the movement of the powder spraying squeegee 31 and the sintering device 4 and in which the computer for controlling the cutting controls the movement of the main shaft 5.

Furthermore, as shown in the flow chart of FIG. 2-3, the control method can also be adopted in which, in addition to the computer for controlling the multilayering and the sintering and the computer for controlling the cutting, the computer for controlling the movement of the powder spraying squeegee 31 and the sintering device 4, and the main shaft 5 is provided and is operated with the computer for controlling the multilayering and the sintering and the computer for controlling the cutting in a coordinated manner.

INDUSTRIAL APPLICABILITY

A plurality of embodiments and Examples have been described as above, and the present invention in which, at the stage of the sintering and the subsequent stages up to cooling, the inert gas for preventing the oxidization of the metal powder is efficiently used can be utilized in all fields of three-dimensional shaping devices.

REFERENCE SIGNS LIST

1: Chamber
10: Shaped article
2: Table
30: Powder supply device
31: Powder spraying squeegee
32: Horizontal-direction drive mechanism for powder spraying squeegee
33: Pipe
34: Support member for powder spraying squeegee
4: Sintering device
41: Holding member for sintering device
42: Horizontal-direction drive mechanism for sintering device
5: Main shaft
51: Holding member for main shaft
52: Three-dimensional-direction drive mechanism for main shaft
6: Shield plate
60: Opening portion formed in shield plate
71: Rotation shaft
72: Door
8: Ceiling
81: Transparent region
92: Ball screw or chain for movement for moving powder spraying squeegee in horizontal direction
93: Coupling rotation portion of rotation shaft and ball screw or chain for movement

The invention claimed is:

1. A three-dimensional shaping device, comprising:
   at least one chamber,
   an elevatable/lowerable table for forming a powder layer within a first region of the at least one chamber and,
   a powder supply device within a second region of the at least one chamber for supplying a powder layer to the table,
   an inert gas injection port provided in the first region of the elevatable/lowerable table,
   a shield plate to prevent leakage of the inert gas from the region of the elevatable/lowerable table, the shield plate dividing the first region of the elevatable/lowerable table from the second region of the powder supply device,
   a powder squeegee moving on the powder layer for removing excess powder from the layer on the table,
   the shield plate is constructed to be freely opened or closed so that the powder squeegee traveling across the table is adapted to pass through the shield plate,
   a sintering device which applies a laser beam to a shaping region of a three-dimensional shaped article on the table via a transparent region in a ceiling of the at least one chamber,
   a horizontal-direction drive mechanism for the powder squeegee, and
   another shield plate divides:
      a) the horizontal-direction drive mechanism for the powder squeegee and
      b) the first region of the table.

2. The three-dimensional shaping device according to claim 1, wherein the horizontal-direction drive mechanism includes:
   one of a ball screw and a chain for moving the powder squeegee in a horizontal direction in the first region of the table, and
   a rotation shaft which transmits rotation drive to the one of the ball screw and the chain for movement, penetrates through the shield plate and is coupled to a rotation drive mechanism.

3. The three-dimensional shaping device according to claim 1, further including a support member which supports the powder squeegee and which is moved in a horizontal direction together with the powder squeegee, the support member being fixed to a door that slides within the shield plate, and the door has a horizontal width larger than that of the shield plate such that an opening portion is not formed during sliding movement of the door and the door is coupled to the horizontal-direction drive mechanism.

4. The three-dimensional shaping device according to claim 1, further comprising:
   a main shaft for cutting a sintered three-dimensional shaped article provided within the first region of the table and
   a three-dimensional-direction drive mechanism for the main shaft provided within the first region of the table.

5. The three-dimensional shaping device according to claim 4,
   wherein the shield plate is constructed to be freely opened or closed, and
   wherein the three-dimensional-direction drive mechanism for the main shaft for cutting the sintered three-dimensional shaped article is provided on a side of a region of the horizontal-direction drive mechanism for the powder squeegee.

6. The three-dimensional shaping device according to claim 4,
   wherein:
      the at least one chamber includes two chambers which are adjacent each other,
      the table is provided in each of regions on a side where the two chambers are adjacent to each other,
      the powder supply device is provided in each of regions where the two chambers are not adjacent to each other,
      the main shaft is moved by the three-dimensional-direction drive mechanism provided within the regions where the two chambers are adjacent to each other,
      the sintering device is moved by the horizontal-direction drive mechanism provided on an upper side of a ceiling of the regions where the two chambers are adjacent to each other and
   further comprising a control device which alternately moves the main shaft and the sintering device between the two chambers.

7. The three-dimensional shaping device according to claim 4,
   wherein:
      the table is provided in each of regions on a side where the two chambers are adjacent to each other,
      the powder supply device is provided on one side of regions where the two chambers are not adjacent to each other,
      the main shaft is moved by the three-dimensional-direction drive mechanism provided within the regions where the two chambers are adjacent to each other,
      the sintering device is moved by the horizontal-direction drive mechanism provided on an upper side of a ceiling of the regions where the two chambers are adjacent to each other and
   further comprising a control device which alternately moves the main shaft, the sintering device and the powder squeegee corresponding to the powder supply device between the two chambers.

8. A three-dimensional shaping method using the three-dimensional shaping device according to claim 5, comprising the steps of:
   adopting the table, the powder supply device, the powder squeegee, and the sintering device for one chamber,
   multilayering of powder with the powder squeegee,
   sintering of the powder with the sintering device, and
   then cutting with the main shaft.

9. A three-dimensional shaping device, comprising:
   at least one chamber,
   an elevatable/lowerable table for forming a powder layer within a first region of the at least one chamber and,
   a powder supply device within a second region of the at least one chamber for supplying a powder layer to the table,
   an inert gas injection port provided in the first region of the elevatable/lowerable table,
   a shield plate to prevent leakage of the inert gas from the region of the elevatable/lowerable table, the shield plate dividing the first region of the elevatable/lowerable table from the second region of the powder supply device,
   a powder squeegee moving on the powder layer for removing excess powder from the layer on the table,
   a pipe which supplies powder dropped from the powder supply device to the powder squeegee which has traveled to a side of the shield plate penetrates through the shield plate,
   a sintering device which applies a laser beam to a shaping region of a three-dimensional shaped article on the table via a transparent region in a ceiling of the at least one chamber,
   a horizontal-direction drive mechanism for the powder squeegee, and
   another shield plate divides:
      a) the horizontal-direction drive mechanism for the powder squeegee and
      b) the first region of the table.

10. The three-dimensional shaping device according to claim 9, wherein the horizontal-direction drive mechanism includes:
   one of a ball screw and a chain for moving the powder squeegee in a horizontal direction in the region of the table, and
   a rotation shaft which transmits rotation drive to the one of the ball screw and the chain for movement, penetrates through the shield plate and is coupled to a rotation drive mechanism.

11. The three-dimensional shaping device according to claim 9,
   further including a support member which supports the powder squeegee and which is moved in a horizontal direction together with the powder squeegee, the support member being fixed to a door that slides within the shield plate, and the door has a horizontal width larger than that of the shield plate such that an opening portion is not formed during sliding movement of the door and the door is coupled to the horizontal-direction drive mechanism.

12. The three-dimensional shaping device according to claim 9, further comprising:
   a main shaft for cutting a sintered three-dimensional shaped article provided within the first region of the table and
   a three-dimensional-direction drive mechanism for the main shaft provided within the region of the table.

13. The three-dimensional shaping device according to claim 12,
wherein the shield plate is constructed to be freely opened or closed, and
wherein the three-dimensional-direction drive mechanism for the main shaft for cutting the sintered three-dimensional shaped article is provided on a side of a region of the horizontal-direction drive mechanism for the powder squeegee.

14. The three-dimensional shaping device according to claim 12,
wherein:
the at least one chamber includes two chambers which are adjacent each other,
the table is provided in each of regions on a side where the two chambers are adjacent to each other,
the powder supply device is provided in each of regions where the two chambers are not adjacent to each other,
the main shaft is moved by the three-dimensional-direction drive mechanism provided within the regions where the two chambers are adjacent to each other,
the sintering device is moved by the horizontal-direction drive mechanism provided on an upper side of a ceiling of the regions where the two chambers are adjacent to each other and
further comprising a control device which alternately moves the main shaft and the sintering device between the two chambers.

15. The three-dimensional shaping device according to claim 12,
wherein:
the table is provided in each of regions on a side where the two chambers are adjacent to each other,
the powder supply device is provided on one side of regions where the two chambers are not adjacent to each other,
the main shaft is moved by the three-dimensional-direction drive mechanism provided within the regions where the two chambers are adjacent to each other,
the sintering device is moved by the horizontal-direction drive mechanism provided on an upper side of a ceiling of the regions where the two chambers are adjacent to each other and
further comprising a control device which alternately moves the main shaft, the sintering device and the powder squeegee corresponding to the powder supply device between the two chambers.

16. A three-dimensional shaping method using the three-dimensional shaping device according to claim 13, comprising the steps of:
adopting the table, the powder supply device, the powder squeegee, and the sintering device for one chamber,
multilayering of powder with the powder squeegee,
sintering of the powder with the sintering device, and
then cutting with the main shaft.

17. A three-dimensional shaping device, comprising:
at least one chamber,
an elevatable/lowerable table for forming a powder layer within a first region of the at least one chamber and,
a powder supply device within a second region of the at least one chamber for supplying a powder layer to the table,
an inert gas injection port provided in the first region of the elevatable/lowerable table,
a shield plate to prevent leakage of the inert gas from the region of the elevatable/lowerable table, the shield plate dividing the first region of the elevatable/lowerable table from the second region of the powder supply device,
a powder squeegee moving on the powder layer for removing excess powder from the layer on the table,
a part of a region of the shield plate forms a powder supply port for the powder squeegee which has traveled to a side of the shield plate,
a pipe through which powder passes through when dropping from the supply port is provided to protrude at a lower part of the shield plate,
a sintering device which applies a laser beam to a shaping region of a three-dimensional shaped article on the table via a transparent region in a ceiling of the at least one chamber,
a horizontal-direction drive mechanism for the powder squeegee, and
another shield plate divides:
a) the horizontal-direction drive mechanism for the powder squeegee and
b) the first region of the table.

18. The three-dimensional shaping device according to claim 17, wherein the horizontal-direction drive mechanism includes:
one of a ball screw and a chain for moving the powder squeegee in a horizontal direction in the first region of the table, and
a rotation shaft which transmits rotation drive to the one of the ball screw and the chain for movement, penetrates through the shield plate and is coupled to a rotation drive mechanism.

19. The three-dimensional shaping device according to claim 17,
further including a support member which supports the powder squeegee and which is moved in a horizontal direction together with the powder squeegee, the support member being fixed to a door that slides within the shield plate, and the door has a horizontal width larger than that of the shield plate such that an opening portion is not formed during sliding movement of the door and the door is coupled to the horizontal-direction drive mechanism.

20. The three-dimensional shaping device according to claim 17, further comprising:
a main shaft for cutting a sintered three-dimensional shaped article provided within the first region of the table and
a three-dimensional-direction drive mechanism for the main shaft provided within the first region of the table.

21. The three-dimensional shaping device according to claim 20,
wherein the shield plate is constructed to be freely opened or closed, and
wherein the three-dimensional-direction drive mechanism for the main shaft for cutting the sintered three-dimensional shaped article is provided on a side of a region of the horizontal-direction drive mechanism for the powder squeegee.

22. The three-dimensional shaping device according to claim 20,
wherein:
the at least one chamber includes two chambers which are adjacent each other,
the table is provided in each of regions on a side where the two chambers are adjacent to each other, the powder supply device is provided in each of regions where the two chambers are not adjacent to each other, the main shaft is moved by the three-dimensional-direction drive mechanism provided within the regions where the two chambers are adjacent to each other, the sintering device is moved by the horizontal-direction drive mechanism provided on an upper side of a ceiling of the regions where the two chambers are adjacent to each other and further comprising a control device which alternately moves the main shaft and the sintering device between the two chambers.

23. The three-dimensional shaping device according to claim 20, wherein:

the table is provided in each of regions on a side where the two chambers are adjacent to each other, the powder supply device is provided on one side of regions where the two chambers are not adjacent to each other, the main shaft is moved by the three-dimensional-direction drive mechanism provided within the regions where the two chambers are adjacent to each other, the sintering device is moved by the horizontal-direction drive mechanism provided on an upper side of a ceiling of the regions where the two chambers are adjacent to each other and further comprising a control device which alternately moves the main shaft, the sintering device and the powder squeegee corresponding to the powder supply device between the two chambers.

* * * * *